US007922610B2

United States Patent
Nihei et al.

(10) Patent No.: US 7,922,610 B2
(45) Date of Patent: Apr. 12, 2011

(54) LINE PRESSURE CONTROL DEVICE AND METHOD FOR BELT TYPE CONTINUOUSLY VARIABLE TRANSMISSION

(75) Inventors: Hironori Nihei, Zama (JP); Tetsuya Izumi, Yokohama (JP); Seonjae Kim, Seoul (KR); Fumito Shinohara, Atsugi (JP); Toshiyuki Shibuya, Sagamihara (JP); Toshiji Iida, Sagamihara (JP)

(73) Assignee: JATCO Ltd, Fuji-shi (JP)

( * ) Notice: Subject to any disclaimer, the term of this patent is extended or adjusted under 35 U.S.C. 154(b) by 498 days.

(21) Appl. No.: 11/542,191

(22) Filed: Oct. 4, 2006

(65) Prior Publication Data
US 2007/0082769 A1 Apr. 12, 2007

(30) Foreign Application Priority Data

Oct. 6, 2005 (JP) ................................. 2005-293722

(51) Int. Cl.
*F16H 61/00* (2006.01)
(52) U.S. Cl. ................. 474/28; 474/18; 477/45; 477/48
(58) Field of Classification Search .................... 474/18, 474/28, 11, 12, 69, 70; 477/44, 45, 46, 48, 477/158, 159, 160, 163; *F16H 61/02*
See application file for complete search history.

(56) References Cited

U.S. PATENT DOCUMENTS

| 5,700,224 | A | * | 12/1997 | Suzuki et al. | ................... 477/45 |
| 6,398,693 | B1 | | 6/2002 | Kawamura | |
| 6,980,897 | B2 | * | 12/2005 | Aoki et al. | ....................... 701/51 |
| 2003/0050149 | A1 | | 3/2003 | Ilda et al. | |
| 2004/0162183 | A1 | * | 8/2004 | Wakahara et al. | .............. 477/18 |

FOREIGN PATENT DOCUMENTS

| DE | 100 23 782 A1 | 12/2001 |
| EP | 0 424 005 A2 | 4/1991 |
| EP | 0 892 196 A2 | 1/1999 |
| JP | 8-74959 A | 3/1996 |
| JP | 2001-99280 A | 4/2001 |
| JP | 2004-190492 A | 7/2004 |

OTHER PUBLICATIONS

Translation of DE 10023782.*

* cited by examiner

*Primary Examiner* — Robert A Siconolfi
*Assistant Examiner* — Vu Q Nguyen
(74) *Attorney, Agent, or Firm* — Foley & Lardner LLP (57) ABSTRACT

In a line pressure control device for a belt type continuously variable transmission according to this invention, when a line pressure is feedback-controlled to equal a target line pressure which is equal to or greater than the larger of oil pressures supplied to a primary pulley and a secondary pulley (S1), and it is determined that the target line pressure has fallen below a first low pressure, leading to a divergence between the target line pressure and the actual line pressure (S6), the target line pressure is restricted such that the target line pressure does not fall below a lower limit value (S7).

9 Claims, 6 Drawing Sheets

LINE PRESSURE CONTROL DEVICE AND METHOD FOR BELT TYPE CONTINUOUSLY VARIABLE TRANSMISSION

FIELD OF THE INVENTION

This invention relates to a technique for preventing hunting in a speed ratio, which is caused by an excessive decrease in line pressure, in a line pressure control device for a belt type continuously variable transmission.

BACKGROUND OF THE INVENTION

A belt type continuously variable transmission in which the rotation speed of an input shaft connected to a drive source is varied continuously and transmitted to an output shaft is known. A belt type continuously variable transmission is constituted by a primary pulley, a secondary pulley, and a belt wrapped around the pulleys, and by varying the width of each pulley, the contact radius between the belt and the pulley is varied, leading to variation in a speed ratio. Oil pressure required to vary the pulley width is supplied by an oil pump and regulated as a line pressure by a solenoid or the like. This line pressure is further regulated by a spool or the like and then supplied.

By setting the line pressure low, an improvement in fuel economy is achieved, but when the line pressure decreases below an oil pressure (primary pressure) required for the primary pulley and an oil pressure (secondary pressure) required for the secondary pulley, the speed ratio varies.

JP2001-99280A published by the Japan Patent Office in 2001 discloses a technique of reducing the line pressure while keeping it higher than the primary pressure and secondary pressure by feedback-controlling the actual line pressure to a target line pressure.

SUMMARY OF THE INVENTION

Here, a current value of a solenoid corresponding to a target line pressure is calculated by searching a table showing the relationship between the current value of a line pressure solenoid and a line pressure command value. Individual differences occur among solenoids, and therefore the target line pressure is controlled by selecting an optimum table from among a large number of tables.

Figure 3:
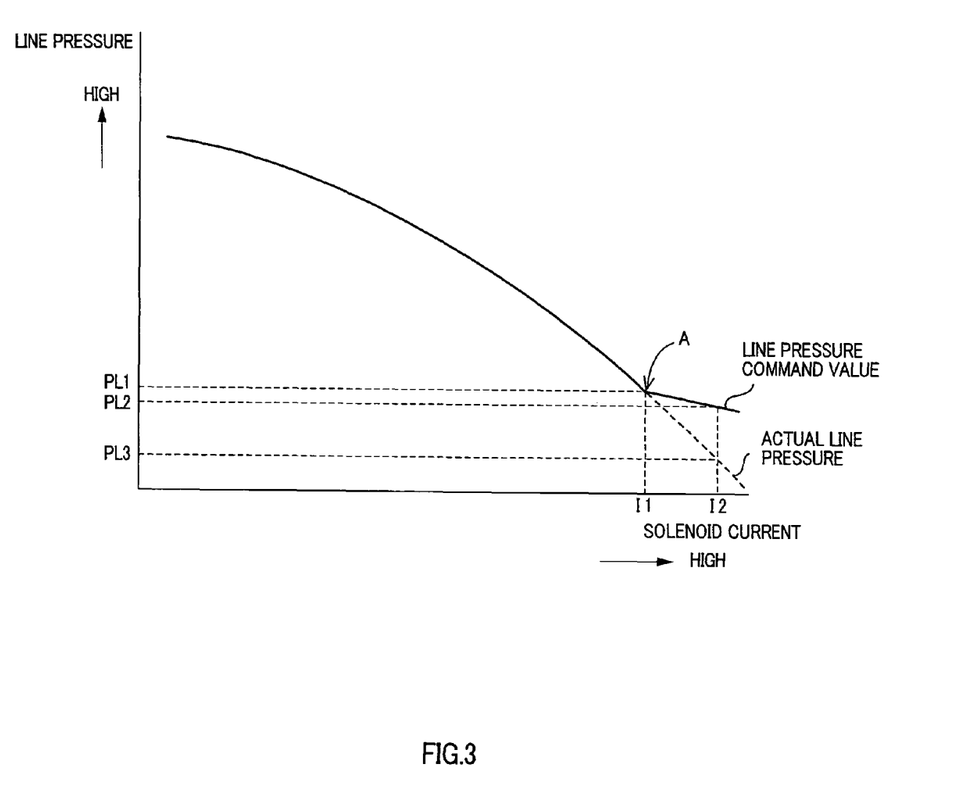
FIG. 3 is a table showing a relationship between a solenoid current and a line pressure.

FIG. 3 is a table showing the relationship between the solenoid current and the line pressure command value, which is set such that the line pressure command value decreases as the solenoid current increases. The solid line indicates the line pressure command value, and the broken line indicates the actual line pressure.

As shown in FIG. 3, depending on the table, a region in which the line pressure command value exhibits substantially no change in relation to variation in the current value of the solenoid may exist at and below a predetermined line pressure, in contrast to the actual characteristics of the relationship. More specifically, when the solenoid current is raised such that the line pressure decreases, and the line pressure is lowered to PL2 from a state in which the solenoid current is I1 and the line pressure command value is PL1, the solenoid current becomes I2 according to the table. However, the actual line pressure is PL3 when the solenoid current is I2, and hence when the solenoid current is raised to I2, the actual line pressure falls to PL3. When the actual line pressure falls below a target value, an attempt is made to raise the line pressure through feedback control, possibly leading to hunting in the speed ratio.

In recent years, demand for improved fuel economy has grown, and as a result, the line pressure is required to be as low as possible. When the line pressure is controlled in order to satisfy this demand, the target line pressure may be set at or below the aforementioned predetermined line pressure, causing the hunting described above.

An object of this invention is to prevent hunting in a speed ratio, which is caused by a dramatic reduction in the actual line pressure during feedback control of the line pressure.

In order to achieve the above object, this invention provides a line pressure control device for a belt type continuously variable transmission in which a belt is wrapped around a primary pulley connected to an input side of a vehicle drive system and a secondary pulley connected to an output side, a groove width of the primary pulley and the secondary pulley is varied in accordance with an oil pressure supplied by a hydraulic pump, and a speed ratio is varied in accordance with the groove width. The transmission comprises a first pressure regulating valve which comprises a solenoid and regulates the oil pressure supplied by the hydraulic pump as a line pressure by varying a valve opening in accordance with a solenoid current supplied to the solenoid, a second pressure regulating valve which regulates an oil pressure supplied to the primary pulley on the basis of the line pressure, a third pressure regulating value which regulates an oil pressure supplied to the secondary pulley on the basis of the line pressure. The device comprises a controller which calculates a target value of the line pressure which is equal to or greater than the larger of the oil pressures supplied to the primary pulley and the secondary pulley, calculates the solenoid current supplied to the solenoid required to realize the target line pressure, feedback-controls the line pressure to equal the target line pressure by controlling the solenoid current, determines that the target line pressure has fallen below a first low pressure, leading to a divergence between the target line pressure and the actual line pressure, and restricts the target line pressure such that when a divergence between the target line pressure and the actual line pressure is determined to have occurred while feedback-controlling the line pressure to equal the target line pressure, the target line pressure does not fall below a lower limit value.

According to this invention, when the line pressure falls to the vicinity of the first low pressure during feedback control of the line pressure to improve the fuel economy, a lower limit value is set on the line pressure and control is performed to ensure that the line pressure does not fall below the lower limit value. In so doing, hunting in the speed ratio, which is caused by a dramatic reduction in the line pressure, can be suppressed.

The details as well as other features and advantages of this invention are set forth in the remainder of the specification and are shown in the accompanying drawings.

DESCRIPTION OF THE PREFERRED EMBODIMENTS

Figure 1:
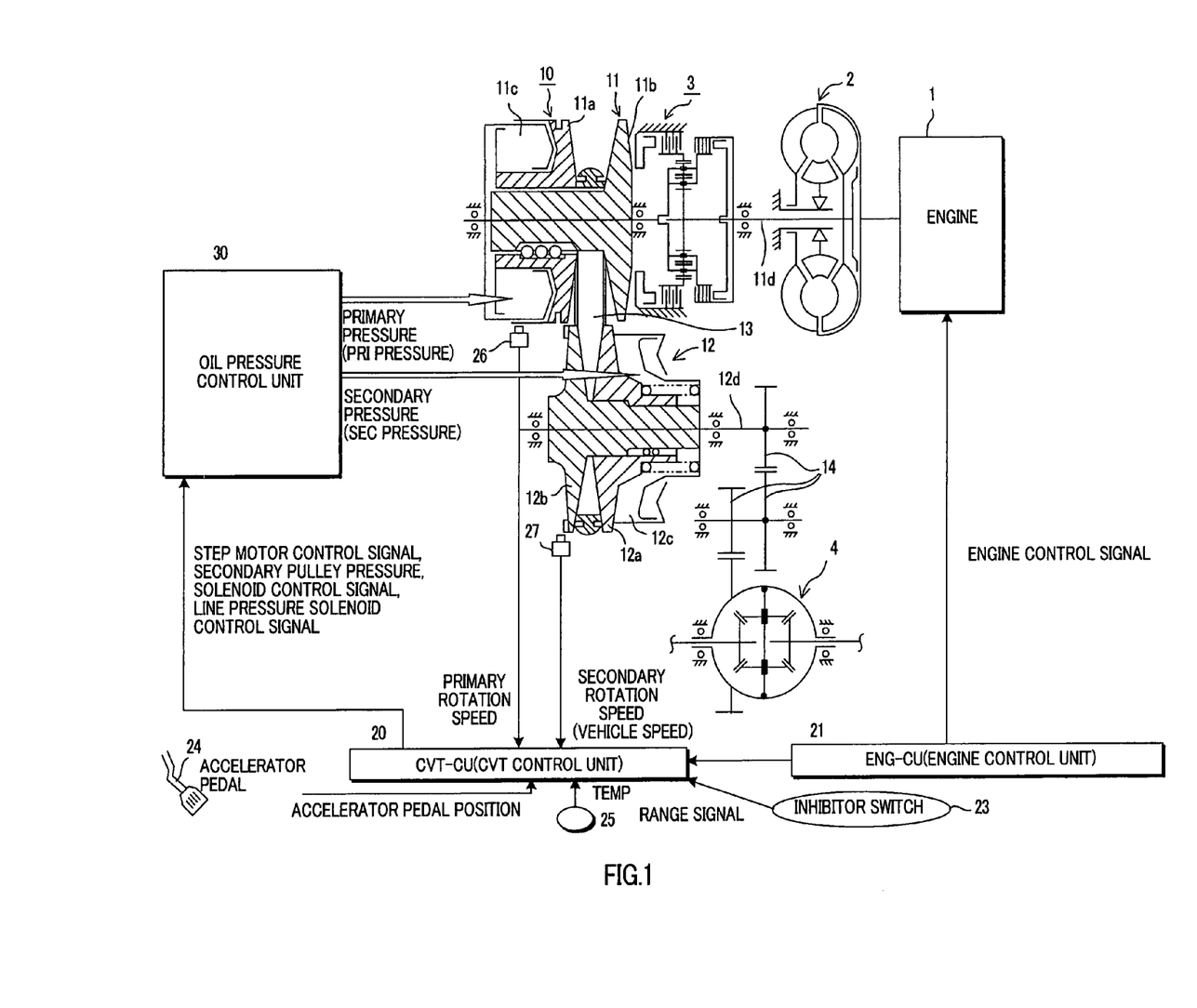
FIG. 1 is a schematic diagram showing a line pressure control device for a belt type continuously variable transmission according to this embodiment.

An embodiment of this invention will be described in detail below with reference to the drawings. FIG. 1 is a schematic diagram showing a line pressure control device for a belt type continuously variable transmission according to this embodiment. A belt type continuously variable transmission (continuously variable speed changing means) 10 comprises a primary pulley 11, a secondary pulley 12, a V belt 13, a CVT control unit 20 (CVTCU hereafter), and an oil pressure control unit 30, and performs a speed change operation using a line pressure as a source pressure.

The primary pulley 11 is an input shaft side pulley which inputs the rotation of an engine 1 into the belt type continuously variable transmission 10. The primary pulley 11 comprises a fixed conical plate 11b which rotates integrally with an input shaft 11d, and a movable conical plate 11a which is disposed opposite the fixed conical plate 11b to form a V-shaped pulley groove, and which can be displaced axially by oil pressure acting on a primary pulley cylinder chamber 11c. The primary pulley 11 is connected to the engine 1 via a forward-reverse switching mechanism 3 and a torque converter 2 comprising a lockup clutch, and inputs the rotation of the engine 1. The rotation speed of the primary pulley 11 is detected by a primary pulley rotation speed sensor 26.

The V belt 13 is wrapped around the primary pulley 11 and secondary pulley 12 such that the rotation of the primary pulley 11 is transmitted to the secondary pulley 12.

The secondary pulley 12 outputs the rotation transmitted by the V belt 13 to a differential 4. The secondary pulley 12 comprises a fixed conical plate 12b which rotates integrally with an output shaft 12d, and a movable conical plate 12a which is disposed opposite the fixed conical plate 12b to form a V-shaped pulley groove, and which can be displaced axially in accordance with oil pressure acting on a secondary pulley cylinder chamber 12c. It should be noted that a pressure-receiving surface area of the secondary pulley cylinder chamber 12c is set substantially equally to the pressure-receiving surface area of the primary pulley cylinder chamber 11c.

The secondary pulley 12 is connected to the differential 4 via an idler gear 14 and an idler shaft, and outputs the rotation to the differential 4. The rotation speed of the secondary pulley 12 is detected by a secondary pulley rotation speed sensor 27. The vehicle speed may be calculated from the rotation speed of the secondary pulley 12.

The CVTCU 20 determines the speed ratio (a value obtained by dividing the effective radius of the secondary pulley 12 by the effective radius of the primary pulley 11) and a contact frictional force on the basis of signals from an inhibitor switch 23, an accelerator pedal position sensor 24, an oil temperature sensor 25, the primary pulley rotation speed sensor 26, the secondary pulley rotation speed sensor 27, and so on, as well as input torque information from an engine control unit 21, and controls the belt type continuously variable transmission 10 by transmitting commands to the oil pressure control unit 30.

The oil pressure control unit 30 operates on the basis of the commands from the CVTCU 20. The oil pressure control unit 30 supplies the primary pulley 11 and secondary pulley 12 with oil pressure, thereby causing the movable conical plate 11a and the movable conical plate 12a to reciprocate in a rotary axis direction.

When the movable conical plate 11a and the movable conical plate 12a move, the pulley groove width varies. As a result, the V belt 13 moves over the primary pulley 11 and secondary pulley 12. Thus the contact radius of the V belt 13 relative to the primary pulley 11 and secondary pulley 12 varies, whereby the speed ratio and the contact frictional force of the V belt 13 are controlled.

The rotation of the engine 1 is input into the belt type continuously variable transmission 10 via the torque converter 2 and the forward-reverse switching mechanism 3, and transmitted from the primary pulley 11 to the differential 4 via the V belt 13 and secondary pulley 12.

When the accelerator pedal is depressed or a shift change is performed in a manual mode, the movable conical plate. 11a of the primary pulley 11 and the movable conical plate 12a of the secondary pulley 12 are axially displaced, thereby varying the contact radius thereof with the V belt 13 such that the speed ratio is varied continuously.

Figure 2:
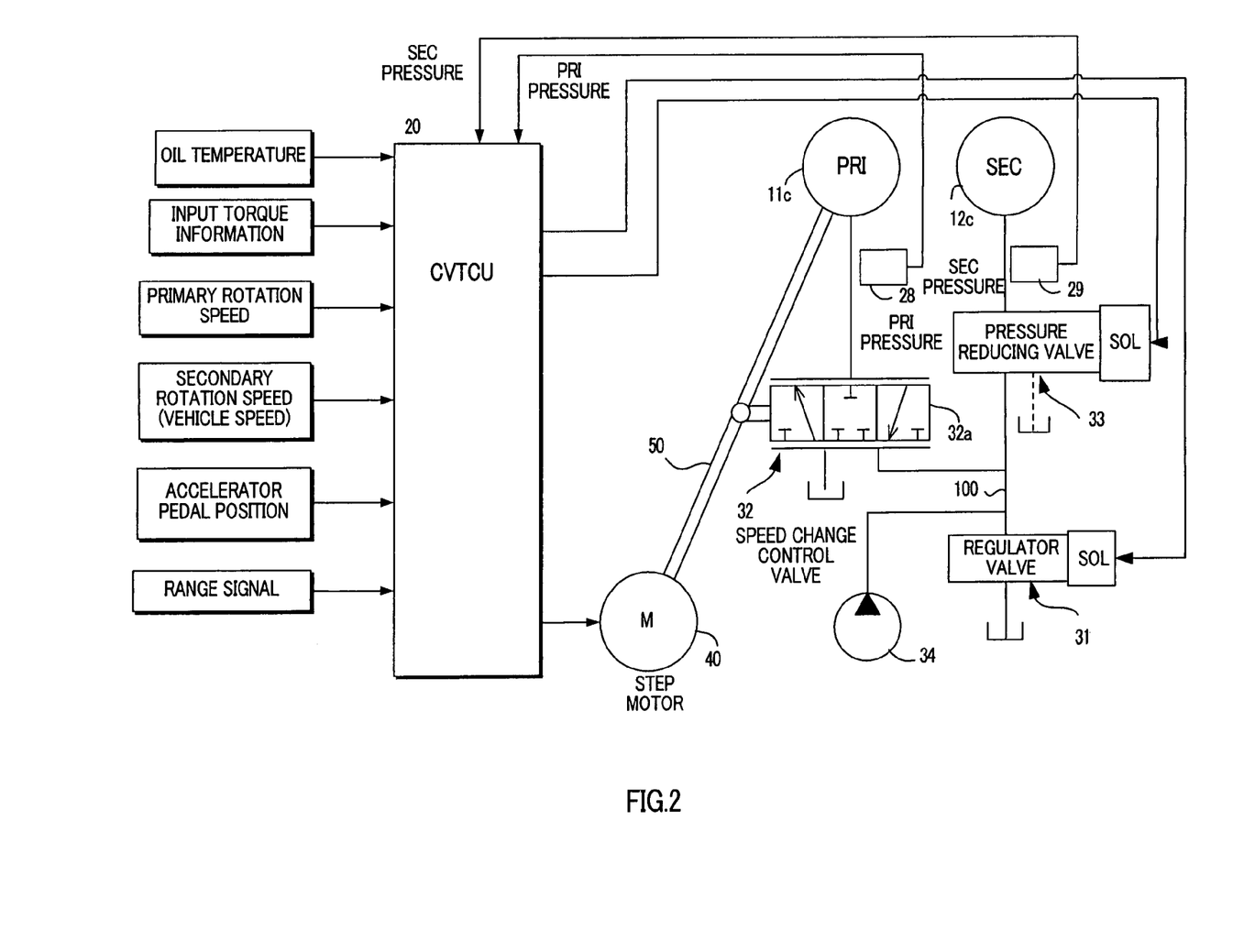
FIG. 2 is a schematic diagram of an oil pressure control unit and a CVTCU.

FIG. 2 is a schematic diagram of the oil pressure control unit and the CVTCU.

The oil pressure control unit 30 comprises a regulator valve 31 (first pressure regulating valve), a speed change control valve 32 (second pressure regulating valve), and a pressure reducing valve 33 (third pressure regulating valve). The oil pressure control unit 30 controls oil pressure supplied by a hydraulic pump 34, and supplies the oil pressure to the primary pulley 11 and secondary pulley 12.

The regulator valve 31 is a pressure regulating valve which comprises a solenoid and regulates the pressure of the oil pumped by the hydraulic pump 34 to a predetermined line pressure in accordance with a command (for example, a duty signal or the like) from the CVTCU 20 and in accordance with driving conditions.

The speed change control valve 32 is a control valve which controls the oil pressure (primary pressure hereafter) in the primary pulley cylinder chamber 11c to a desired target pressure. The speed change control valve 32 is connected to a servo link 50 constituting a mechanical feedback mechanism. The speed change control valve 32 is driven by a step motor 40 connected to one end of the servo link 50, and receives feedback regarding the groove width, or in other words the actual speed ratio, from the movable conical plate 11a of the primary pulley 11, which is connected to the other end of the servo link 50. The speed change control valve 32 regulates the primary pressure by absorbing and discharging the oil pressure of the primary pulley cylinder chamber 11c in accordance with the displacement of a spool 32a, thereby realizing a target speed ratio which is instructed according to a drive position of the step motor 40, and when the speed change is actually complete, the speed change control valve 32 receives the displacement from the servo link 50 and holds the spool 32a in a closed position.

The pressure reducing valve 33 is a control valve which comprises a solenoid and controls the pressure (secondary pressure hereafter) that is supplied to the secondary pulley cylinder chamber 12c to a desired target pressure.

The line pressure supplied by the hydraulic pump 34 and regulated by the regulator valve 31 is supplied to the speed change control valve 32 and the pressure reducing valve 33, respectively.

The speed ratio of the primary pulley 11 and secondary pulley 12 is controlled by the step motor 40 which is driven in accordance with a speed change command signal from the CVTCU 20. The spool 32a of the speed change control valve 32 is driven in accordance with the displacement of the servo link 50, which operates in conjunction with the step motor 40, and thus the line pressure supplied to the speed change control valve 32 is regulated such that the primary pressure is supplied to the primary pulley 11. Hence, the groove width is variably controlled and a predetermined speed ratio is set.

The CVTCU 20 variably controls the speed ratio and the contact frictional force of the V belt 13 by reading a range signal from the inhibitor switch 23, an accelerator pedal position from the accelerator pedal position sensor 24, an oil temperature of the belt type continuously variable transmission 10 from the oil temperature sensor 25, signals from the primary pulley speed sensor 26, secondary pulley speed sensor 27, oil pressure sensors 28, 29, and so on. It should be noted that the oil pressure sensor 28 is a sensor which detects the primary pressure applied to the primary pulley cylinder chamber 11c, while the oil pressure sensor 29 is a sensor which detects the secondary pressure applied to the secondary pulley cylinder chamber 12c.

The CVTCU 20 determines a target speed ratio in accordance with the vehicle speed, throttle opening, and so on, and drives the step motor 40 to control the current speed ratio toward the target speed ratio. The CVTCU 20 also calculates a target line pressure value (target line pressure calculating means) on the basis of the input torque information, speed ratio, and oil temperature such that the target line pressure is equal to or greater than the larger of the oil pressures supplied to the primary pulley and secondary pulley, performs feedback control to match the line pressure to the target value by driving the solenoid of the regulator valve 31 (line pressure control means), determines a target value for the secondary pressure, and controls the secondary pressure through feedback control by driving the solenoid of the pressure reducing valve 33 in accordance with the detected value of the oil pressure sensor 28 and the target value.

Here, a method of controlling the line pressure by having the CVTCU 20 control the solenoid current for driving the solenoid will be described with reference to FIG. 3. FIG. 3 is a table showing the relationship between the solenoid current and a line pressure command value, which is set such that the line pressure command value decreases as the solenoid current increases. By referring to this table, a solenoid current corresponding to the desired line pressure is found (solenoid current calculating means), and the solenoid current is controlled to realize the found current value.

A large number of such tables are prepared and a single table selected therefrom in consideration of individual differences among continuously variable transmission solenoids is applied to calculation of the line pressure command value. The table may include an inflection point A such as that shown in FIG. 3. In the high current value region beyond the inflection point A, the line pressure command value exhibits substantially no change in relation to variation in the solenoid current. However, even in this region the actual line pressure falls in accordance with increases in the solenoid current, as shown by the broken line in FIG. 3, and as a result, the problem described below occurs.

When the solenoid current is raised such that the line pressure falls, and the line pressure is lowered to PL2 from a state in which the solenoid current is I1 and the line pressure command value is PL1, the solenoid current becomes I2 according to the table. However, the actual line pressure is PL3 when the solenoid current is I2, and hence when the solenoid current is raised to I2, the actual line pressure falls to PL3. As a result, the speed ratio differs from the target, and hunting occurs.

Therefore, the CVTCU 20 performs control to prevent speed ratio hunting caused by an excessive decrease in the actual line pressure by setting a lower limit value with respect to the line pressure command value.

Figure 4:
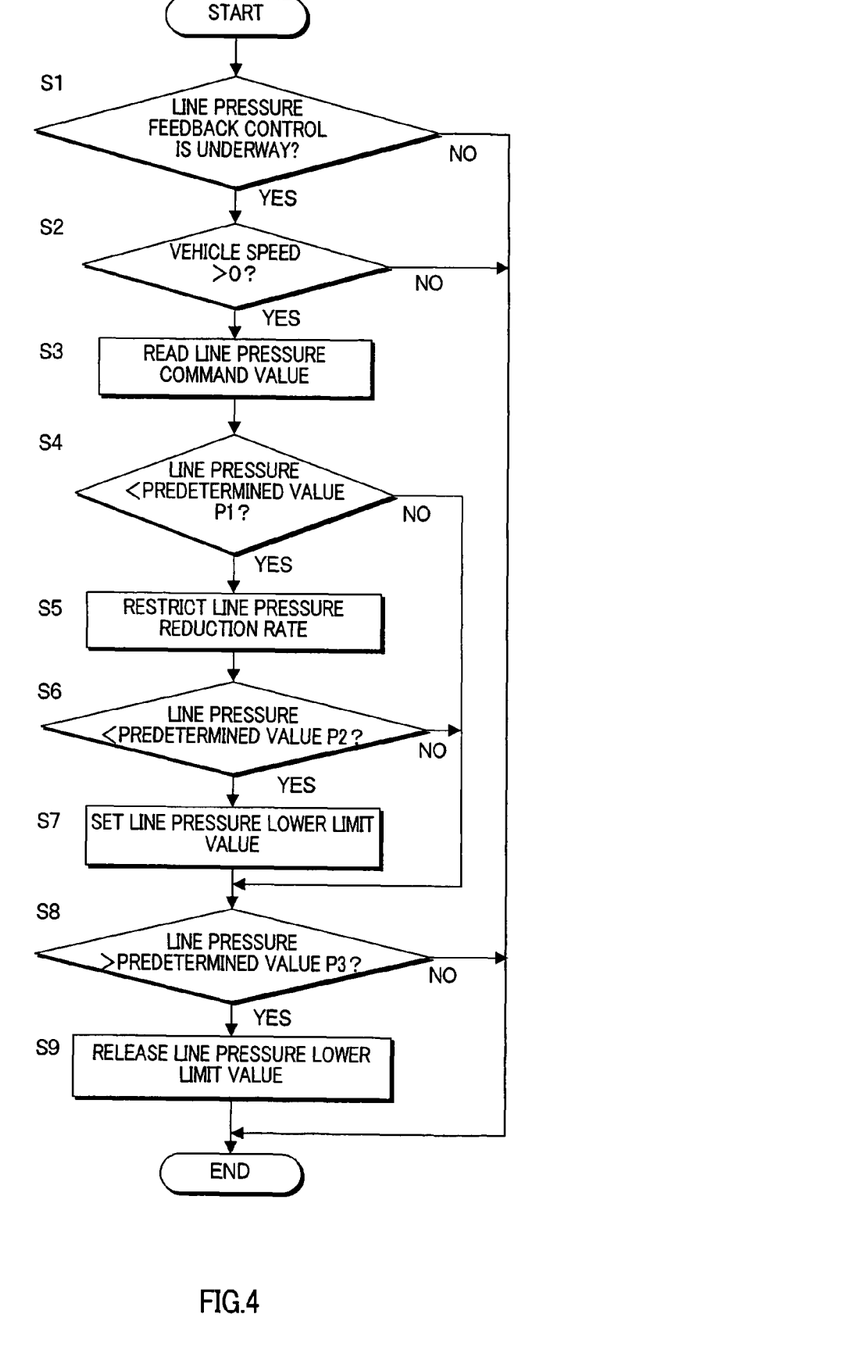
FIG. 4 is a flowchart illustrating the control of the line pressure control device for a belt type continuously variable transmission according to this embodiment.

The control performed by the CVTCU 20 will be described below with reference to the flowchart in FIG. 4. It should be noted that this control is performed repeatedly at very frequent intervals (of 10 ms, for example).

In a step S1, a determination is made as to whether or not line pressure feedback control is underway. When line pressure feedback control is underway, the routine advances to a step S2, and when control is not underway, the processing is terminated. Line pressure feedback control is performed to lower the line pressure to the vicinity of the primary pressure in order to improve the fuel economy when the vehicle is traveling at a constant speed and the speed ratio is set to a comparatively high side. A detailed description of this control has been omitted. This invention has been designed to suppress speed ratio hunting caused by a dramatic reduction in line pressure when the line pressure is reduced through line pressure feedback control in order to improve the fuel economy, and at times such as when the line pressure is controlled to a minimum in order to protect the V belt 13, for example, line pressure feedback control is not executed, and therefore the control of this invention is not performed.

In the step S2, a determination is made as to whether or not the vehicle speed is greater than zero. When the vehicle speed is greater than zero, the routine advances to a step S3, and when the vehicle speed is zero, the processing is terminated. When the vehicle speed is zero, or in other words when the vehicle is stationary, hunting caused by speed ratio variation does not occur even when the line pressure decreases, and hence the control of this invention is terminated.

In the step S3, the line pressure command value is read.

In a step S4, a determination is made as to whether or not the line pressure command value is smaller than a predetermined value P1 (second low pressure). If the line pressure command value is smaller than the predetermined value P1, the routine advances to a step S5, and if the line pressure command value is equal to or larger than the predetermined value P1, the routine advances to a step S8. The predetermined value P1 is a value for determining in advance that the line pressure has fallen to the inflection point of the table, or in other words that the line pressure has fallen to the region where the line pressure command value exhibits substantially no change relative to variation in the solenoid current, and is determined in advance through experiment or the like.

In the step S5 (reduction rate restricting means), the reduction rate of the line pressure command value is restricted. The reduction rate of the line pressure command value is restricted to a value at which control can be performed to ensure that the line pressure command value does not pass the inflection point of the table following a dramatic decrease. This value is determined in advance through experiment or the like.

In a step S6 (divergence determining means), a determination is made as to whether or not the line pressure is smaller than a predetermined value P2 (first low pressure). When the line pressure is smaller than the predetermined value P2, the routine advances to a step S7, and when the line pressure is equal to or greater than the predetermined value P2, the routine advances to the step S8. The predetermined value P2 is a value for determining that the line pressure has fallen to the inflection point of the table, and is therefore set to be a smaller value than the predetermined value P1. It should be noted that a large number of the tables is prepared and the existence and position of the inflection point differ according to the selected table. Accordingly, the predetermined value P2 is determined in advance through experiment or the like such that speed ratio hunting does not occur regardless of the table that is selected.

In the step S7 (line pressure restricting means), a lower limit value is set with respect to the line pressure. The lower limit value serves as a threshold for restricting reduction of the line pressure, and when the lower limit value is set, the line pressure cannot fall below the lower limit value. For example, the lower limit value is set as the line pressure at the point of execution of this step.

In the step S8, a determination is made as to whether or not the line pressure is greater than a predetermined value P3 (third low pressure). When the line pressure is greater than the predetermined value P3, the routine advances to a step S9, and when the line pressure is equal to or smaller than the predetermined value P3, the processing is terminated. The predetermined value P3 is a value for determining that the line pressure has become less likely to fall to the inflection point of the table, and is set to be larger than the predetermined value P1 and provided with a hysteresis characteristic.

In the step S9 (restriction releasing means), the line pressure lower limit value is released.

Figure 5:
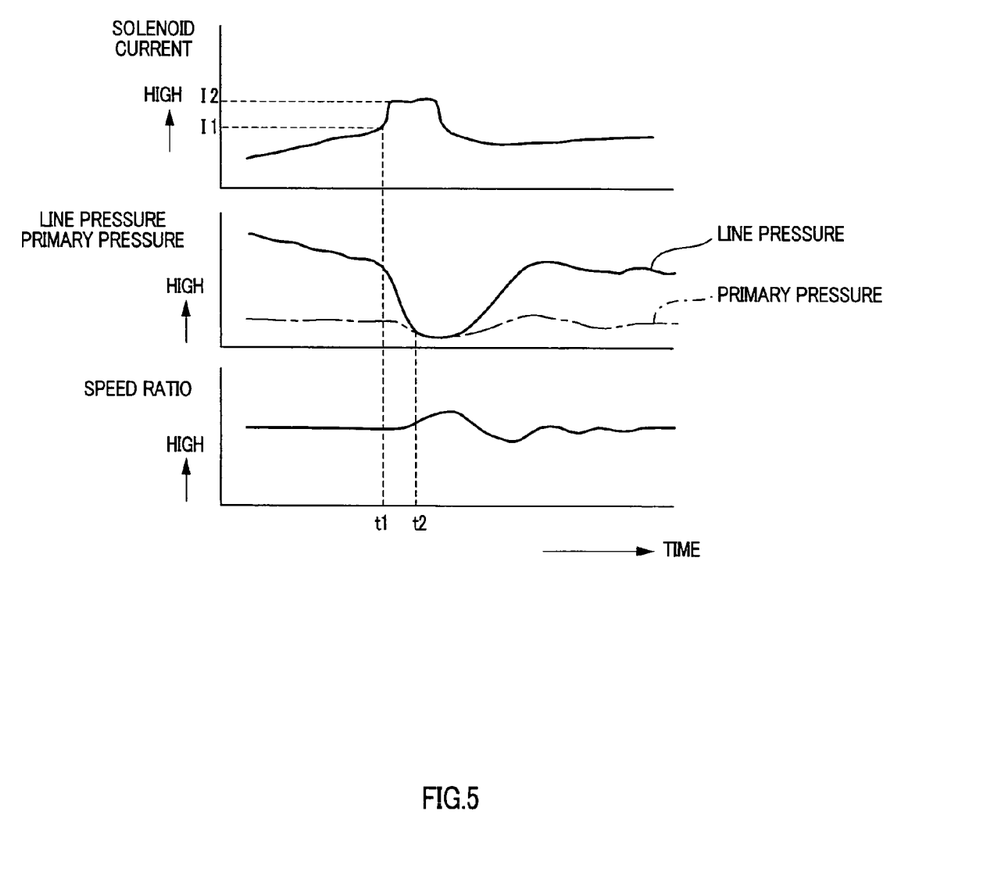
FIG. 5 is a time chart showing line pressure control according to a conventional example.
Figure 6:
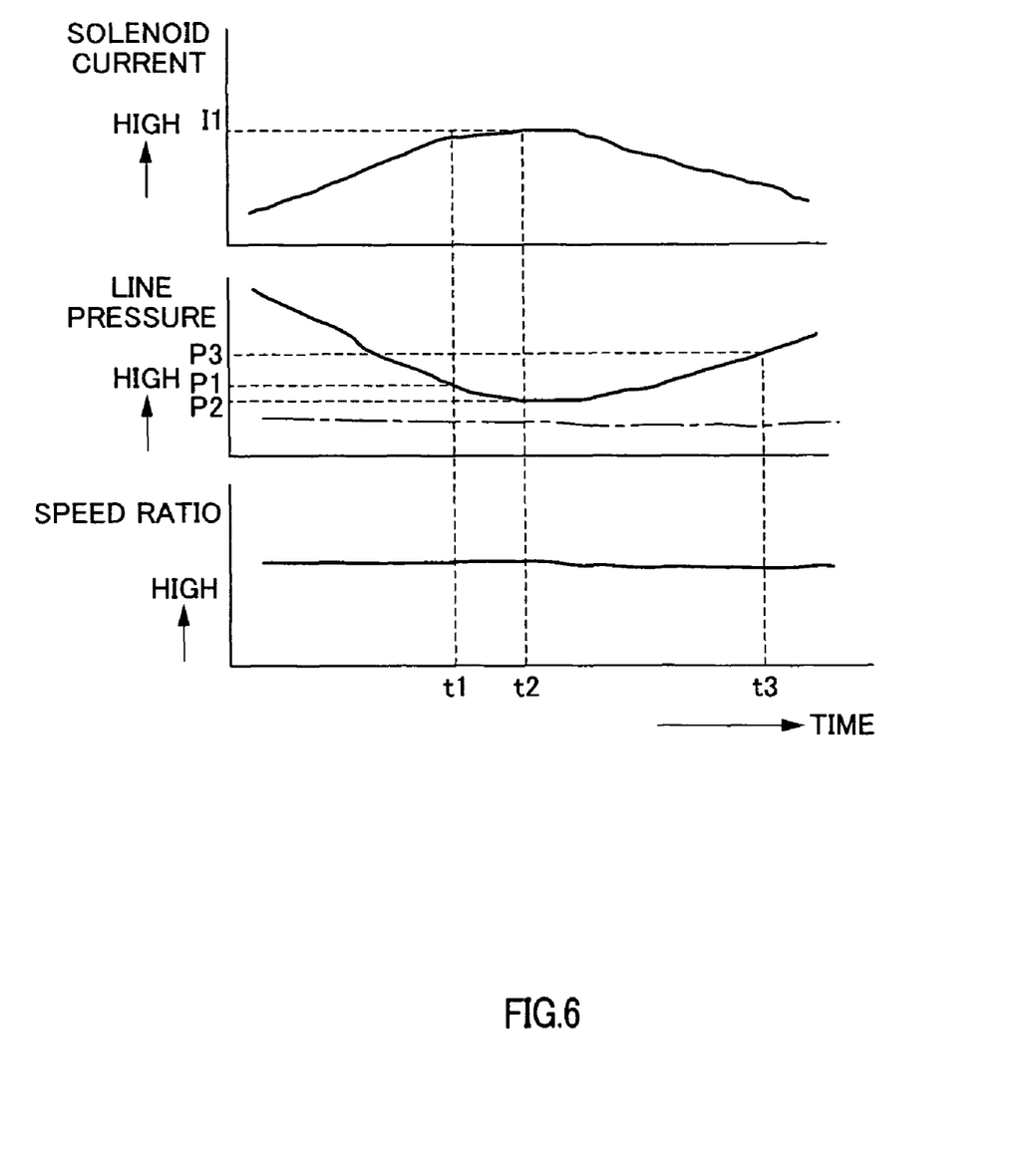
FIG. 6 is a time chart showing line pressure control according to this embodiment.

Next, the actions of this embodiment will be described using FIGS. 5 and 6. FIG. 5 is a time chart showing line pressure control according to a conventional example, and FIG. 6 is a time chart illustrating the actions of the line pressure control device for a belt type continuously variable transmission according to this embodiment. Both FIG. 5 and FIG. 6 show the solenoid current, the line pressure, and the speed ratio.

First, referring to FIG. 5, the conventional example will be described. When line pressure feedback control is underway during steady state traveling at a substantially constant throttle opening, the solenoid current is raised in order to lower the line pressure and thereby improve the fuel economy.

At a time t1, when the line pressure is reduced through line pressure feedback control, the line pressure falls to the inflection point of the table and the solenoid current rises to I1. If an attempt is made to reduce the line pressure further, the solenoid current rises rapidly to I2 and the line pressure decreases rapidly.

At a time t2, when the line pressure falls to the vicinity of the primary pressure, the primary pressure also decreases, and hence hunting occurs in the speed ratio.

Next, referring to FIG. 6, this embodiment will be described. When line pressure feedback control is underway during steady state traveling at a substantially constant throttle opening, the solenoid current is raised in order to lower the line pressure and thereby improve the fuel economy.

At the time t1, when the line pressure is reduced through line pressure feedback control, the line pressure falls below the predetermined value P1, and hence the reduction rate of the line pressure is restricted to a predetermined reduction rate. As a result, the line pressure decreases gently.

At the time t2, the line pressure falls below the predetermined value P2, and hence the lower limit value of the line pressure is set as the line pressure at this point in time. As a result, the line pressure is prevented from falling below the lower limit value and can be maintained at a higher pressure than the primary pressure, thereby preventing the occurrence of hunting in the speed ratio.

Thereafter, the line pressure rises as the solenoid current falls, and at a time t3, the line pressure rises above the predetermined value P3. Hence, the lower limit value of the line pressure is released.

According to this embodiment as described above, when the line pressure is reduced through feedback control in order to enhance the fuel economy, and the line pressure falls to the predetermined value P2, a lower limit value is set on the line pressure and control is performed to ensure that the line pressure does not fall below this lower limit value. As a result, speed ratio hunting caused by a dramatic reduction in the line pressure can be suppressed.

Further, when the line pressure falls below the predetermined value P1, the reduction rate of the line pressure is restricted, and hence a situation in which the line pressure decreases dramatically into the region below the inflection point of the table can be prevented. As a result, speed ratio hunting caused by a dramatic reduction in the line pressure to the primary pressure can be suppressed even more reliably. Moreover, when the line pressure rises above the predetermined value P3, the line pressure lower limit value is released, enabling a reduction in the control load when the likelihood of the line pressure decreasing dramatically and entering the region below the inflection point of the table is low.

This invention is not limited to the embodiment described above, and it goes without saying that various alterations and modifications may be made within the technical scope of this invention and are considered equivalent thereto.

In this embodiment, the line pressure lower limit value is set and control is performed to ensure that the line pressure does not fall below the lower limit value when the line pressure falls to the predetermined value P2. However, the inflection point of the table showing the relationship between the solenoid current and the line pressure command value may be set at the lower limit value of the line pressure. In this case, the position of the inflection point differs in each selected table, and as a result the lower limit value can be set with a greater degree of precision, enabling greater improvement of the fuel economy.

This application claims priority from Japanese Patent Application 2005-293722, filed Oct. 6, 2005, which is incorporated herein by reference in its entirety.

What is claimed is:

1. A line pressure control device for a belt type continuously variable transmission in which a belt is wrapped around a primary pulley connected to an input side of a vehicle drive system and a secondary pulley connected to an output side, a groove width of the primary pulley and the secondary pulley is varied in accordance with an oil pressure supplied by a hydraulic pump, and a speed ratio is varied in accordance with the groove width, wherein the transmission comprises:

a first pressure regulating valve which comprises a solenoid and regulates the oil pressure supplied by the hydraulic pump as a line pressure by varying a valve opening in accordance with a solenoid current supplied to the solenoid;

a second pressure regulating valve which regulates an oil pressure supplied to the primary pulley on the basis of the line pressure; and a third pressure regulating valve which regulates an oil pressure supplied to the secondary pulley on the basis of the line pressure, and the device comprising a controller which is configured to calculate a target line pressure which is equal to or greater than the larger of the oil pressures supplied to the primary pulley and the secondary pulley;

calculate the solenoid current supplied to the solenoid required to realize the target line pressure by looking up a table showing a relationship between the solenoid current and the target line pressure, the table is set such that the target line pressure decreases as the solenoid current increases and the table has an inflection point in which a decrease rate of the target line pressure in a high current value region beyond the inflection point is smaller than a decrease rate of the target line pressure in a low current value region below the inflection point;

feedback-control the line pressure to equal the target line pressure by controlling the solenoid current;

determine that a divergence between the target line pressure and the actual line pressure occurs when the target line pressure has fallen below a first low pressure which is a line pressure at the inflection point during the feedback-control; and restrict the target line pressure, when the divergence is determined to have occurred during the feedback-control, such that the target line pressure does not fall below a lower limit value, the lower limit value being set to the line pressure at the time of a determination in which the divergence occurs.

2. The line pressure control device as defined in claim 1, wherein the controller is further configured to restrict a reduction rate of the target line pressure when the target line pressure falls below a second low pressure which is higher than the first low pressure.

3. The line pressure control device as defined in claim 1, wherein the controller is further configured to release a restriction on the target line pressure when the target line pressure rises above a third low pressure which is higher than the first low pressure while restricting the target line pressure.

4. A line pressure control method for a belt type continuously variable transmission in which a belt is wrapped around a primary pulley connected to an input side of a vehicle drive system and a secondary pulley connected to an output side, a groove width of the primary pulley and the secondary pulley is varied in accordance with an oil pressure supplied by a hydraulic pump, and a speed ratio is varied in accordance with the groove width, the transmission comprising:

a first pressure regulating valve which comprises a solenoid and regulates the oil pressure supplied by the hydraulic pump as a line pressure by varying a valve opening in accordance with a solenoid current supplied to the solenoid;

a second pressure regulating valve which regulates an oil pressure supplied to the primary pulley on the basis of the line pressure; and a third pressure regulating valve which regulates an oil pressure supplied to the secondary pulley on the basis of the line pressure, and the method comprising:

calculating a target line pressure which is equal to or greater than the larger of the oil pressures supplied to the primary pulley and the secondary pulley;

calculating the solenoid current supplied to the solenoid required to realize the target line pressure by looking up a table showing a relationship between the solenoid current and the target line pressure, the table being set such that the target line pressure decreases as the solenoid current increases and the table has an inflection point in which a decrease rate of the target line pressure in a high current value region beyond the inflection point is smaller than a decrease rate of the target line pressure in a low current value region below the inflection point;

feedback-controlling the line pressure to equal the target line pressure by controlling the solenoid current;

determining that a divergence between the target line pressure and the actual line pressure occurs when the target line pressure has fallen below a first low pressure which is a line pressure at the inflection point during the feedback-controlling; and restricting the target line pressure, when the divergence is determined to have occurred during the feedback-controlling, such that the target line pressure does not fall below a lower limit value, the lower limit value being set to the line pressure at the time of a determination in which the divergence occurs.

5. The line pressure control method as defined in claim 4, further comprising:

restricting a reduction rate of the target line pressure when the target line pressure falls below a second low pressure which is higher than the first low pressure.

6. The line pressure control method as defined in claim 4, further comprising:

releasing a restriction on the target line pressure when the target line pressure rises above a third low pressure which is higher than the first low pressure while restricting the target line pressure.

7. A line pressure control device for a belt type continuously variable transmission in which a belt is wrapped around a primary pulley connected to an input side of a vehicle drive system and a secondary pulley connected to an output side, a groove width of the primary pulley and the secondary pulley is varied in accordance with an oil pressure supplied by a hydraulic pump, and a speed ratio is varied in accordance with the groove width, the transmission comprising:

a first pressure regulating valve which comprises a solenoid and regulates the oil pressure supplied by the hydraulic pump as a line pressure by varying a valve opening in accordance with a solenoid current supplied to the solenoid;

a second pressure regulating valve which regulates an oil pressure supplied to the primary pulley on the basis of the line pressure; and a third pressure regulating valve which regulates an oil pressure supplied to the secondary pulley on the basis of the line pressure, and the device comprising:

target line pressure calculating means for calculating a target line pressure which is equal to or greater than the larger of the oil pressures supplied to the primary pulley and the secondary pulley;

solenoid current calculating means for calculating the solenoid current supplied to the solenoid required to realize the target line pressure by looking up a table showing a relationship between the solenoid current and the target line pressure, the table set such that the target line pressure decreases as the solenoid current increases and the table has an inflection point in which a decrease rate of the target line pressure in a high current value region beyond the inflection point is smaller than a decrease rate of the target line pressure in a low current value region below the inflection point;

line pressure control means for feedback-controlling the line pressure to equal the target line pressure by controlling the solenoid current;

divergence determining means for determining that the target line pressure has fallen below a first low pressure, when a divergence between the target line pressure and the actual line pressure occurs, the first low pressure being a line pressure at the inflection point during the feedback-controlling performed by the line pressure control means; and line pressure restricting means for restricting the target line pressure such that the target line pressure does not fall below a lower limit value when the divergence is determined to have occurred during the feedback-controlling performed by the line pressure control means, the lower limit value being set to the line pressure during the determining performed by the divergence determining means.

8. The line pressure control device as defined in claim 7, further comprising:

reduction rate restricting means for restricting a reduction rate of the target line pressure when the target line pressure falls below a second low pressure which is higher than the first low pressure.

9. The line pressure control device as defined in claim 7, further comprising:

restriction releasing means for releasing a restriction on the target line pressure when the line pressure restricting means has placed the restriction on the target line pressure and the target line pressure rises above a third low pressure which is higher than the first low pressure.

* * * * *